2,960,508
CERTAIN 2-(1-ALKENYL)-OXAZOLIDINES

Willard J. Croxall, Elkhart, Ind., and Jack H. Mellema, Holland, Mich., assignors to Miles Laboratories, Inc., Elkhart, Ind., a corporation of Indiana No Drawing. Filed Mar. 4, 1959, Ser. No. 797,019

7 Claims. (Cl. 260—307)

This invention relates to new and useful chemical compounds and especially to substituted oxazolidines. More specifically, the present invention pertains to 3(2)-(di)substituted-2-alkenyloxazolidines corresponding to the following general formula:

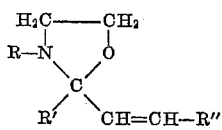

wherein R represents lower alkyl or lower aralkyl groups, R', hydrogen or lower alkyl groups, and R", hydrogen, lower alkyl or lower alkenyl groups.

Briefly, the novel compositions of this invention are prepared by refluxing N-substituted-N-alkynyl-2-aminoethanols with a catalytic amount of potassium hydroxide. In consequence of this treatment, the alkynyl aminoethanols are cyclized to yield substituted alkenyloxazolidines, as illustrated by the following equation:

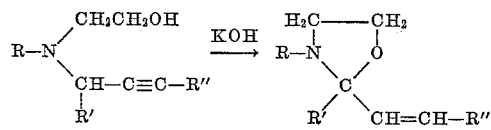

wherein R, R' and R" have the meanings ascribed to them above.

The acetylenic aminoethanols used as starting materials for the preparation of the novel compositions are disclosed in a copending application entitled "Acetylenically Unsaturated Ethanolamines and Process for Their Preparation," U.S. Serial No. 672,571, filed by Willard J. Croxall on July 18, 1957, and assigned to the assignee of the present invention now abandoned.

More particularly, the subject compounds of this invention are made in accordance with the following process description:

A flask equipped with agitator, condenser, thermometer and dropping funnel is charged with a measured amount of an inert solvent, such as p-xylene, toluene, and the like, as well as with a catalytic amount of technical grade potassium hydroxide. This mixture is heated to reflux and stirred. The reflux temperature may range from 110° to 145° C. depending upon the solvent used. The N-substituted-N-alkynyl-2-aminoethanol is then placed in the dropping funnel and added to the reflux mixture in portions of 5 to 10 cc. Refluxing is continued for a period ranging from about a few minutes to about 4 hours. Then the reaction mixture is cooled to room temperature, filtered to remove the sludge (KOH and some tars), and stripped of solvent under reduced pressure. The desired compound is subsequently obtained upon distillation.

The molecular structure of the subject compounds as drawn above was proven as follows:

An acetylenic aminoethanol was cyclized as described above and distilled so as to obtain a relatively small center fraction. This fraction was subjected to catalytic hydrogenation in a Parr Shaker using platinum oxide as catalyst. The calculated amount of hydrogen, namely, one mole per mole of alkenyloxazolidine, was taken up to indicate the presence of a double bond. The resulting compound was fractionated, and the fraction representing the desired material was collected and analyzed. Analytical values demonstrated that the compound obtained was an oxazolidine with a saturated side chain of corresponding length.

Identical oxazolidines with such a saturated side chain were then unequivocally synthesized from an N-substituted-2-aminoethanol and an appropriate aldehyde or ketone according to the following equation:

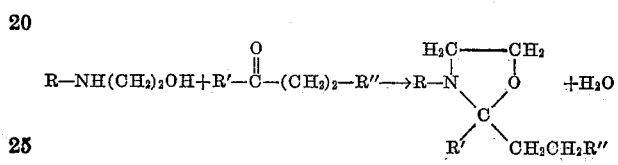

wherein R, R' and R" are substituents defined above. Infra-red curves provide that the materials prepared in accordance with the two methods just described were identical.

The novel substituted alkenyloxazolidines which may be regarded as both allyl ethers and allyl amines, have a great number of applications. They may be polymerized or copolymerized with other polymerizable monomers to form polymers or copolymers having utility, for example, as ion exchange resins and blood extenders. More specifically, for example, when catalyzed with a small amount of peroxide, these oxazolidines yield thick, clear, adhesive, yellow polymers at room temperature while under heating at 125° C. for 24 hours they give clear amber, brittle solids. Moreover, hydroxylated molecules such as those of water, methanol or ethanol undergo addition reactions with the 2-alkenyloxazolidines to produce polymers.

The subject compounds may further be used as chemical intermediates in the preparation of a great number of organic chemicals and as pharmaceutical agents possessing germicidal and hypotensive activity. The following examples will illustrate in greater detail the various compounds within the scope of this invention and the methods for their preparation:

EXAMPLE I

A. Preparation of 3-benzyl-2-ethyl-2-vinyloxazolidine

A one-liter, three-neck flask equipped with stirrer, condenser, and dropping funnel was charged with 20 g. potassium hydroxide and 300 ml. of toluene. The mixture was heated to reflux temperature. N-benzyl-N-(1-ethyl-2-propynyl)-2-aminoethanol (218 g.—1.01 mole) was added in portions of 5–10 cc. There was strong refluxing after each addition. After the total amount was added, the material was refluxed for one hour. It was then cooled, decolorized with activated charcoal and filtered. The toluene was removed by distillation at reduced pressure and the residue distilled through a 12" column packed with stainless steel saddles. The forerun to 95° C./0.15 mm. was discarded, and the product was collected at 95–96° C./0.15 mm.; it had a refractive index of $N_D^{25}$ 1.5195. The yield was 182.7 g. (84.5%). Non-aqueous titration gave the equivalent weight as 218.3 (calculated, 217.3).

B. *Hydrogenation of 3-benzyl-2-ethyl-2-vinyloxazolidine*

A Parr bottle was charged with 43.6 g. (0.2 mole) of the above 3-benzyl-2-ethyl-2-vinyloxazolidine as well as with platinum oxide and 100 ml. of tetrahydrofuran. This compound was hydrogenated at 25° C. at an initial pressure of 55 p.s.i. There was a 12-pound hydrogen uptake (temperature increased to 50° C.) in five hours. The bottle was removed and flushed with nitrogen, and Raney nickel washed in methanol was added. There was an additional uptake of 2 pounds in one hour. Total hydrogen uptake was 14 pounds, while in theory, 0.2 mole would require an uptake of 16 to 18 pounds. The bottle was removed, flushed with nitrogen and its contents filtered. The solvent was removed by distillation at reduced pressure. The residue was distilled through at 12″ column packed with stainless steel saddles. The forerun to 89° C./0.09 mm. was discarded, and the product, 3-benzyl-2,2-diethyloxazolidine, was collected at 89° C./0.09 mm.; it had a refractive index of $N_D^{25}$ 1.5130. The yield was 37.4 g. (86%). Non-aqueous titration gave the equivalent weight as 220.3 (calculated, 219.3).

C. *Preparation of hydrogenated compound by alternate method*

To confirm that the above compound was 3-benzyl-2,2-diethyloxazolidine, N-benzyl-2-aminoethanol and diethylketone were allowed to react with azeotropic removal of water. The resulting oxazolidine was collected by distillation at 92–95° C./0.22 mm.; it had a refractive index of $N_D^{25}$ 1.5128. Non-aqueous titration gave the equivalent weight as 217.3 (calculated, 219.3). Infra-red studies demonstrated that this reaction product had an infra-red curve identical to that of the hydrogenated compound.

EXAMPLE II

*3-benzyl-2-vinyloxazolidine*

A three-liter, three-neck flask was charged with 400 ml. of toluene and 20 g. of potassium hydroxide. The mixture was stirred and heated to reflux temperature (110° C.). Then, 567 g. (3 moles) of N-benzyl-N-2-propynyl-2-aminoethanol were added to the mixture at such a rate that the reaction continued to reflux. There was an exothermic reaction with the temperature reaching 133° C. After addition of the amine the mixture was refluxed for one hour. The reaction mixture was then cooled and activated charcoal added. After filtration the mixture was washed with toluene and the solvent removed by distillation at reduced pressure. Distillation of the residue gave a forerun to 85° C./0.7 mm.; a first fraction which boiled at 90° C./0.7 mm. and had a refractive index of $N_D^{25}$ 1.5285; a second fraction, at 90–92° C./0.7 mm., $N_D^{25}$ 1.5305; a third fraction from 96 to 104° C./0.7 mm.; and a fourth fraction from 106 to 120° C./0.7 mm., $N_D^{25}$ 1.5400. Upon cooling some solid residue was left. The first fraction (319.3 g.) and the second fraction (148 g.) were combined for a total yield of 467.3 g. (82.5%). The final product gave an equivalent weight of 191.98 by non-aqueous titration (calculated, 189).

EXAMPLE III

*3-isopropyl-2-vinyloxazolidine*

A one-liter, three-neck flask was charged with 30 g. of potassium hydroxide and 400 ml. of toluene. The mixture was heated to reflux temperature (112° C.). N-isopropyl-N-2-propynyl-2-aminoethanol (515 g.—4 moles) was added in portions of 5–10 cc. A strong exothermic reaction ensued with the temperature rising to 134° C. After the total amount was added, the material was refluxed for two hours. It was then cooled, decolorized with activated charcoal, filtered through "Dicalite" filter-aid, and the filter cake was washed with toluene. After another filtration through "Dicalite," the toluene was removed by distillation at reduced pressure. Distillation of the residue gave a forerun which was collected to 55° C./12–14 mm. The desired product was collected at 55.5° C./12–14 mm.; it had a refractive index of $N_D^{25}$ 1.4507. Non-aqueous titration gave the equivalent weight as 143.9 (calculated, 141).

EXAMPLE IV

*3-isopropyl-2-ethyl-2-vinyloxazolidine*

Five grams of potassium hydroxide were slurried in 200 ml. of toluene and heated to reflux. N-isopropyl-N-(1-ethyl-2-propynyl)-2-amino-ethanol (84.5 g.—0.5 mole) was added in portions of 5–10 cc. with an exothermic reaction taking place after each addition. After addition was complete, the reaction mixture was refluxed for three hours. Five grams of potassium hydroxide were added to the cold solution and mixed with it for one hour. After filtration and washing with toluene, the toluene was removed by distillation at reduced pressure. The residue was distilled, and a first fraction was collected at 27–29° C./0.25 mm.; it had a refractive index of $N_D^{25}$ 1.4584. A second fraction was collected at 30–32° C./0.25 mm. Its refractive index was $N_D^{25}$ 1.4588. Both fractions were combined to give a yield of 68.5 g. (81%). Non-aqueous titration gave an equivalent weight of 171.73 (calculated, 169).

EXAMPLE V

*3-isopropyl-2-(3′-methyl-1′,3′-butadienyl)oxazolidine*

Five grams of potassium hydroxide were pulverized by rapid stirring after melting in 100 ml. of toluene at reflux. N-isopropyl-N-(4-methyl-4-penten-2-ynyl)-2-aminoethanol (45.2 g.) was added in portions of 5–10 cc. with a strong exothermic reaction taking place after each addition. The mixture was then cooled, and 5 g. of potassium hydroxide were added and admixed for 15 minutes. After filtration and washing with toluene, the solvent was removed by distillation at reduced pressure. Upon distillation of the residue, a first fraction was collected from 67 to 70° C./0.2 mm.; it had a refractive index of $N_D^{25}$ 1.4898. The second fraction, which was collected from 71 to 73° C./0.2 mm., had a refractive index of $N_D^{25}$ 1.4963. The first fraction was redistilled and at 59–60° C./0.1 mm., a material was collected that had a refractive index of $N_D^{25}$ 1.4862. The material collected from 61 to 63° C./0.1 mm. had a refractive index of $N_D^{25}$ 1.4896. The fractions were combined, and the final product showed an equivalent weight of 184.35 by non-aqueous titration (calculated, 181).

EXAMPLE VI

*3-isopropyl-2-(1-n-hexenyl)oxazolidine*

Ten grams of potassium hydroxide were pulverized by rapid stirring after melting in 100 ml. of toluene at reflux. N-isopropyl-N-2-heptynyl-2-aminoethanol (75 g.) was slowly added to the refluxing mixture. When the addition was complete, the mixture was refluxed for four hours and then cooled to room temperature. About 10 g. of KOH were slurried in the cool solution and then decanted therefrom. The material was filtered through "Dicalite" filter-aid and the solvent was removed by distillation at reduced pressure. Upon distillation of the residue, material was collected from 65 to 95° C./0.2 mm. Redistillation of this material gave a forerun, collected at 40–42° C./0.2 mm., with a refractive index of $N_D^{25}$ 1.4403. The product was collected from 60 to 64° C./0.10 mm. and its refractive index was $N_D^{25}$ 1.4596. The desired product showed an equivalent weight of 198.0 by non-aqueous titration (calculated, 196).

In summary, the present invention relates to 3(2)-(di)-substituted-2-alkenyloxazolidines as represented by the structural formula given above. Their chief utility resides in their ability to polymerize. The preferred embodiments are 3-substituted-2-vinyl- and butadienyloxazolidines.

What is claimed is:
1. A substituted alkenyloxazolidine having the formula

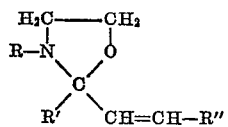

wherein R is a substituent selected from the group consisting of lower alkyl and lower phenalkyl groups; R' is a member selected from the group consisting of hydrogen and lower alkyl groups; and R" is a member selected from the group consisting of hydrogen, lower alkyl and lower alkenyl groups.
2. 3-benzyl-2-vinyloxazolidine.
3. 3-isopropyl-2-vinyloxazolidine.
4. 3-isopropyl-2-ethyl-2-vinyloxazolidine.
5. 3-benzyl-2-ethyl-2-vinyloxazolidine.
6. 3 - isopropyl - 2 - (3' - methyl - 1',3' - butadienyl) oxazolidine.
7. A process for the preparation of novel substituted alkenyl oxazolidines which comprises refluxing an N-substituted-N-alkynyl-2-aminoethanol of the general formula

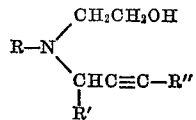

wherein R is selected from the group consisting of lower alkyl and lower phenalkyl groups; R' is a member selected from the group consisting of hydrogen and lower alkyl groups; and R" is a member selected from the group consisting of hydrogen, lower alkyl, and lower alkenyl groups, in the presence of an inert organic solvent and a catalytic amount of potassium hydroxide for a period of from a few minutes to about 4 hours at a temperature of from about 110° to 145° C.; removing the unreacted constituents from the reaction mixture and distilling the desired product therefrom.

References Cited in the file of this patent
Paquin: Chem. Ber., vol. 82, p. 319 (1949).